United States Patent [19]

Hamer

[11] 3,921,462
[45] Nov. 25, 1975

[54] ROTARY BALANCER

[76] Inventor: Floyd S. Hamer, 3930 Bouton Drive, Lakewood, Calif. 90712

[22] Filed: Nov. 1, 1973

[21] Appl. No.: 411,660

Related U.S. Application Data

[63] Continuation of Ser. No. 285,301, Aug. 31, 1972, abandoned.

[52] U.S. Cl. ................................................ 73/482
[51] Int. Cl.². G01M 1/08; G01M 1/12; G01M 1/16
[58] Field of Search ......... 73/66, 459, 460, 482–485

[56] References Cited
UNITED STATES PATENTS

| | | | |
|---|---|---|---|
| 995,109 | 6/1911 | Bassett | 73/482 |
| 1,386,128 | 8/1921 | MacCordy | 73/482 |
| 1,797,269 | 3/1931 | Lungren | 73/66 |
| 2,136,633 | 11/1938 | Morse | 73/482 |
| 2,524,407 | 10/1950 | Trindle | 73/482 |
| 2,721,475 | 10/1955 | Wallace | 73/480 |
| 2,747,411 | 5/1956 | Lannen | 73/483 |
| 2,842,966 | 7/1958 | Rued | 73/483 |
| 2,919,582 | 1/1960 | Riedel | 73/484 |
| 2,940,315 | 6/1960 | Rued | 73/483 |
| 3,036,467 | 5/1962 | McWhorter | 73/459 |
| 3,055,221 | 9/1962 | Bageman et al. | 73/484 |
| 3,164,996 | 1/1965 | Carrigan | 73/483 |
| 3,581,576 | 6/1971 | Reiser | 73/459 |

FOREIGN PATENTS OR APPLICATIONS

| | | | |
|---|---|---|---|
| 570,499 | 7/1945 | United Kingdom | 73/482 |
| 759,222 | 1/1966 | Canada | 73/482 |

*Primary Examiner*—James J. Gill
*Attorney, Agent, or Firm*—Fulwider, Patton, Rieber, Lee & Utecht

[57] ABSTRACT

A rotary balancer for balancing wheels and the like and including a stand having a horizontally rotatable spindle suspended therefrom by means of a swivel joint which provides for rotation about a horizontal balancing axis. A movement amplifying arm projects from the spindle and has an indicator mounted on the free end thereof for indicating travel of the free end of such arm. A drive motor is provided for rotating the spindle at slow speeds so a wheel may be disposed horizontally thereon and as the swivel rotates such spindle and wheel will teeter from one side to the other of the balancing axis thus causing the free end of the amplifying arm to actuate the indicator thus indicating the degree and location of unbalance of such wheel.

15 Claims, 8 Drawing Figures

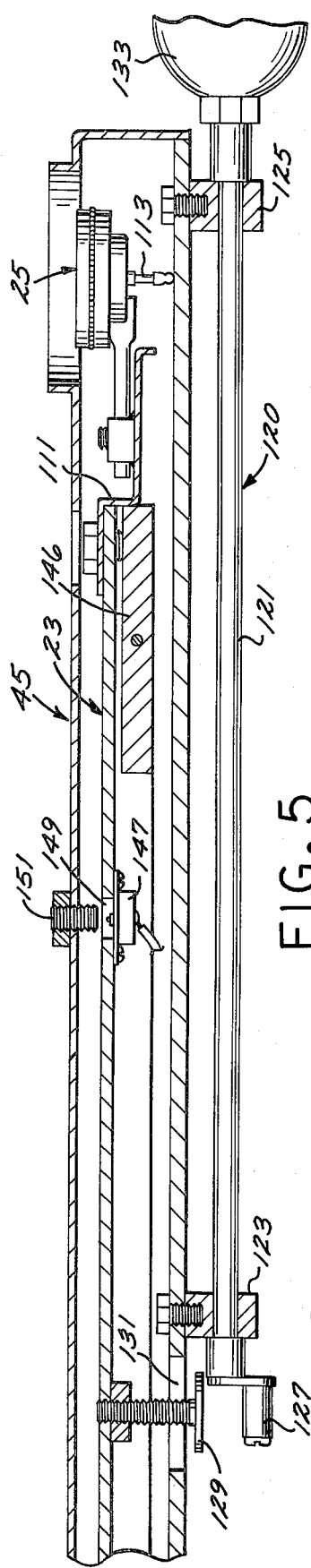
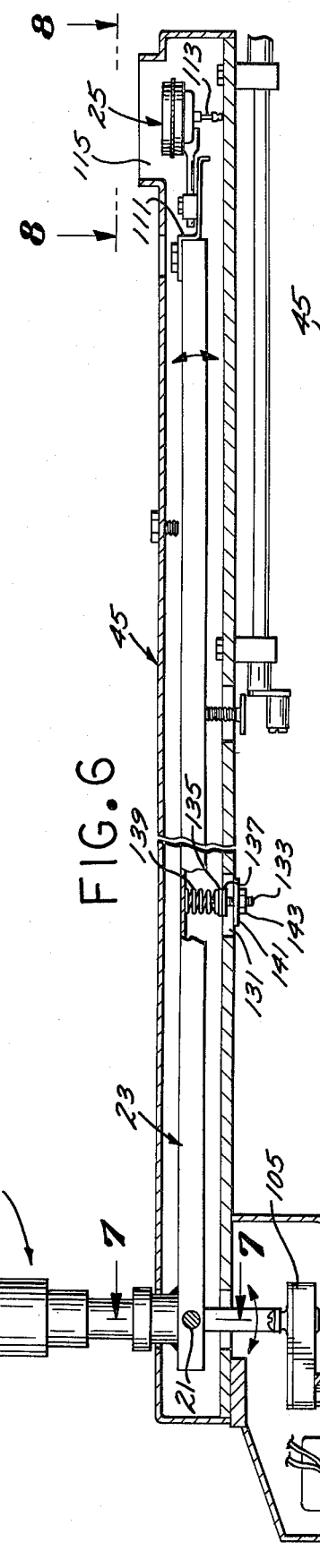
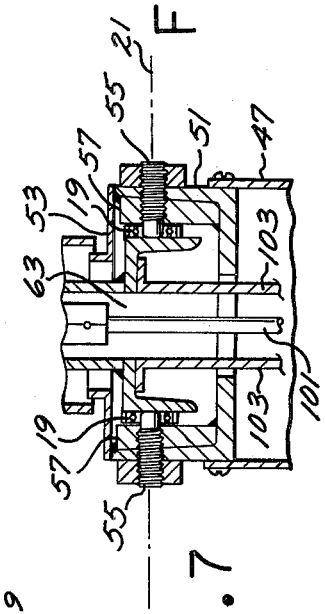
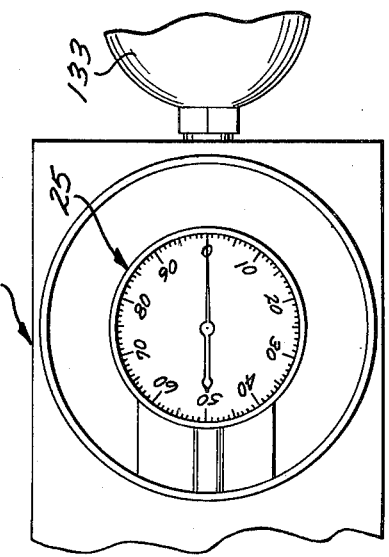

ROTARY BALANCER

CROSS REFERENCE TO RELATED APPLICATION

This application is a continuation of my copending application, Ser. No. 285,301, filed Aug. 31, 1972, and now abandoned.

BACKGROUND OF THE INVENTION

1. Field of the Invention

The rotary balancer of the present invention relates to static balancing devices for balancing vehicle wheels and the like.

2. Description of the Prior Art

Prior art static wheel balancers have been proposed which include a spindle balanced centrally from a point for universal tilting in response to an unbalanced wheel being placed thereon and including a bubble-type level for indicating the light side of such wheel. Wheel balancers of this type suffer the shortcoming that the point of unbalance on the wheel cannot be located with any great degree of accuracy and the failure thereof to give any indication of the magnitude of such unbalance.

Further, wheel balancers have been proposed which include spindles which rotate about the vertical axis and are balanced for pivoting about a horizontal axis and include an elongated arm projecting therefrom to amplify the indication of unbalance. However, such devices do not generally include a motor for rotating such spindles at constant low sped rates to enable the operator to accurately determine the location and degree of unbalance.

SUMMARY OF THE INVENTION

The rotary balancer of the present invention is characterized by a spindle for receipt of a wheel or the like to rotate such wheel about a first axis, such spindle being carried from a stand by means of a swivel joint which balances such spindle for rotation about a balancing axis extending transversely of the first axis. An elongated amplifying arm projects from the spindle and has an indicator mounted to the free extremity thereof for indicating travel of such free end to indicate the location and degree of unbalance of such wheel as it is rotated about the spindle and teeters from one side to the other of the second axis.

The objects and advantages of the present invention will become apparent from a consideration of the following detailed description when taken in conjunction with the accompanying drawings.

DESCRIPTION OF THE DRAWINGS

FIG. 5 is a horizontal sectional view, in enlarged scale, taken along the line 5—5 of FIG. 2;

FIG. 6 is a horizontal sectional view, in enlarged scale, taken along the line 6—6 of FIG. 2;

FIG. 7 is a vertical sectional view, in enlarged scale, taken along the line 7—7 of FIG. 6; and FIG. 8 is a partial top view, in enlarged scale, taken along the line 8—8 of FIG. 6.

DESCRIPTION OF THE PREFERRED EMBODIMENT

Figure 1:
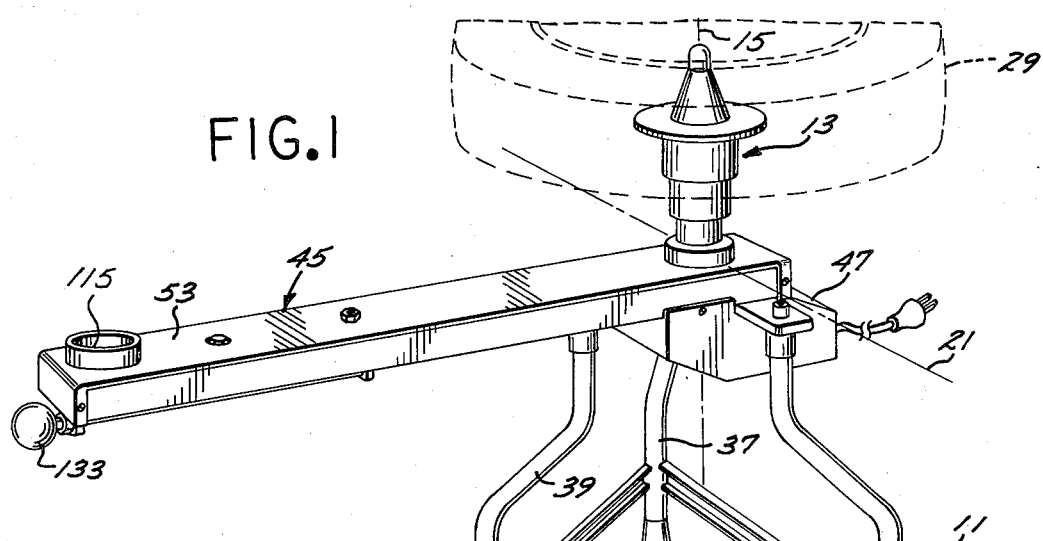
FIG. 1 is a perspective view of a rotary balancer embodying the present invention.
Figure 2:
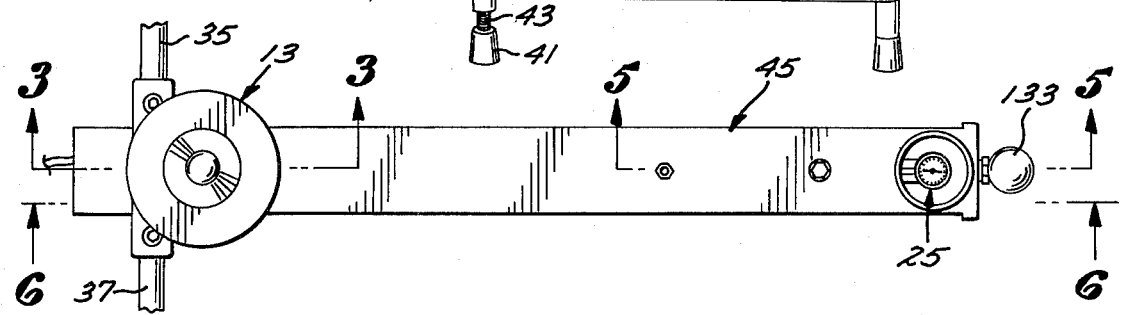
FIG. 2 is a top view, in enlarged scale, of the rotary balancer shown in FIG. 1.

The rotary balancer shown in FIG. 1 is adapted for balancing wheels and includes, generally, a stand 11 supporting a rotary spindle 13 for rotation about a vertical axis 15. The spindle 13 is mounted on one end of a movement amplifying arm 23 (FIG. 6) and such arm is suspended from the stand 11 by means of a pair of ball bearings 19 (FIG. 7) which provide for balancing of the spindle 13 and arm 23 for teetering about a horizontal axis 21 in response to rotation of an unbalanced wheel mounted thereon. Referring to FIG. 6, carried from the free end of the arm 23 is an indicator in the form of a machinist's gauge, generally designated 25, for indicating the displacement of such free end. A drive motor, generally designated 27, is coupled with the spindle 13 for slow speed rotation thereof whereby a wheel 29 (FIG. 4) may be mounted on the spindle 13 and the motor 27 actuated to slowly rotate such spindle thus causing the heavy side of such wheel to teeter the free extremity of the amplification arm 23 downwardly a distance directly proportional to the degree of unbalance of such wheel as the heavy point of such wheel passes over such arm and to then teeter the free end of such arm upwardly as the heavy point of such wheel passes over a point opposed to such arm.

The stand 11 is of generally tubular construction and includes three legs 35, 37 and 39 arranged at the apexes of an equilateral triangle with the legs 35 and 37 being disposed directly below the balancing axis 21 and the leg 39 being disposed directly beneath the amplification arm 23. The lower extremity of the leg 39 includes an adjustment foot 41 carried from a stud 43 which screws into the bottom of such leg for employment in leveling the balancer, as will be described hereinafter.

Mounted from the upper extremity of the legs 35, 37 and 39 is one end of an elongated casing 45 which encases the amplification arm 23 and has a motor housing 47 suspended from the underside thereof for housing the motor 27.

Referring to FIG. 7, the arm casing 45 is in the form of an upwardly opening C-channel 51 covered on its top side by a sheet metal cover 53. Still referring to FIG. 7, the amplification arm 23 is in the form of a downwardly opening C-channel which has the balancing ball bearings 19 affixed to the opposite sides thereof for receipt of the inner ends of respective threaded axle shafts 55 which are screwed through the opposite flanges of the casing channel 51 and project through respective angular spacers 57 to engage the bearings 19 on their inner extremities for support of the rear extremity of the amplification arm 23.

Figure 3:
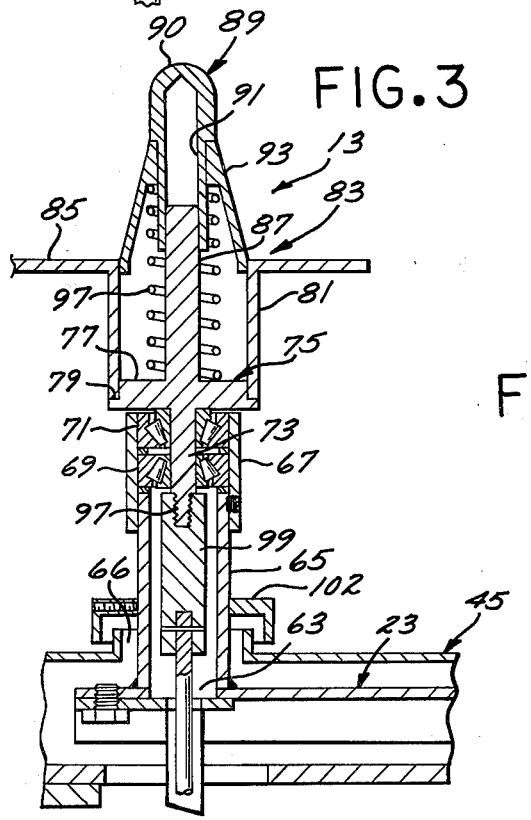
FIG. 3 is a horizontal sectional view, in enlarged scale, taken along the line 3—3 of FIG. 2.

Referring to FIGS. 3, 6 and 7, the rear extremity of the amplification arm 23 is formed with an opening 63 disposed centrally over the transverse balancing axis 21 and mounted thereover is an upstanding tube 65 which projects upwardly through an opening 66 in the casing 45. A coupling 67 is telescoped over the upper extremity of the tube 65 and pressed fit in the upper end of such coupling is a pair of thrust roller bearings 69 and 71 which have the vertical drive shaft 73 of a drive fitting, generally designated 75, telescoped through the inner races thereof. The drive fitting 75 is formed centrally with a horizontal annular flange 77 which is formed with a peripheral shoulder 79 having the lower extremity of the vertical barrel 81 of an annular receiver, generally designated 83, seated thereon. The receiver 83 is formed at its upper extremity with an outwardly flared horizontally extending landing flange 85.

The drive fitting 75 is formed with a vertically projecting guide stem 87 projecting coaxially upwardly through the receiver barrel 81. Telescoped downwardly over the top of such stem 87 is a centering cone, generally designated 89, which is closed on its top end by a central cap formed with a downwardly opening bore 91 telescoped over such stem. The cap 90 is telescoped into the small end of a frusto conical centering skirt 93, the large end of such skirt being telescoped into the barrel 81 of the receiver fitting 53. The centering cone 89 is biased upwardly by means of a coil compression spring 97 telescoped over the stem 87 and sandwiched between such cone and the drive fitting flange 77.

Still referring to FIG. 3, the lower extremity of the drive fitting 75 is formed with a threaded tip 97 whch has the top end of a drive rod 99 screwed thereonto, the bottom end of such drive rod being pinned to the top end of a drive shaft 101 projecting upwardly through the tube 65 from the underside of the amplification rod casing 45.

Referring to FIG. 3, an annular collar 102 fits over the upstanding tube 65 to cover the aperture 66 to prevent entry of debris and the like which may interfere with proper operation of the balancer.

Referring to FIG. 7, a pair of vertically extending motor assembly support straps 103 are disposed on opposite sides of the drive shaft opening 63 and are affixed on their upper extremities to the underside of the amplification arm 23. The bottom extremities of such straps have a gear housing 105 (FIG. 6) affixed thereto, the spindle drive rod 101 projecting upwardly from such housing. Also suspended from the gear housing 105 is the motor 27, such motor being offset to the side of the balancing axis 21 opposite the side to which the arm 23 projects to cause such arm to somewhat counter- balance the weight thereof. The motor rotor 107 provides the input to the gear chain housed in the housing 105. and has a small bore 109 drilled in one side thereof for unbalancing such rotor to introduce a slight amount of high frequency vibration during operation to thus minimize frictional resistance between various moving parts in the baalancer as will be pointed out hereinafter.

Referring to FIG. 6, the free end of the amplification arm 23 has a mounting bracket 111 mounted thereon for receipt of the indicator 25 to hold the actuating traveler 113 of such indicator in driving engagement with support surface defined by the top side of the bottom wall of the casing 45 to impart movement to such indicator in response to upward and downward travel of the free end of such arm. The casing 45 is formed with an upwardly facing aperture 115 confronting the gauge 25 for viewing of the dial thereof.

Still referring to FIG. 5, mounted coextensively under the amplifying arm casing 45 is an actuator, generally designated 120, and including an actuating rod 121 having its opposite ends journaled through bores in respective mounting blocks 123 and 125. The rear extremity of the actuating rod 121 is formed with a crank 127 aligned beneath a vertical actuating stud 129 screwed into the amplifying arm 123 and projecting through an opening 131 formed in the bottom wall of the casing 45. Mounted on the opposite end of the actuating rod 121 is a spherical knob 133 which may be selectively rotated to rotate the rod 121 and engage the crank 127 with the actuating stud 129 to raise the free end of the amplifying arm 23 and retain it captive in an inoperative position, the crank 127 being arranged to assume an over-the-center position when such arm 23 is fully raised.

Referring to FIG. 6, an elongated slot 131 is formed centrally in the bottom wall of the casing 45 and has a nut 135 disposed in overlying position thereon, such nut being formed with a downwardly extending rectangular key 137 which forms a shoulder to engage the side walls of such slot 131 to lock such nut against rotation. A calibration spring 139 is interposed between the underside of the arm 23 and bottom wall of the casing 45 and has a lower coil thereof received under the head of the stud 133 to be held captive thereunder. A washer 141 is received over the lower extremity of the stud 133 and a nut 143 is screwed thereonto so such nut 143 may be easily loosened and the spring 139 shifted longitudinally under the arm 123 to adjust the resistance offered to rotation about the balancing axis 21. Thus, positioning of such spring under the arm 23 may be adjusted so deflection of the machinist's gauge 25 will correspond with the weight which must be added at the periphery of the tire rim to balance various diameter wheels. For example, for the preferred embodiment, a deflection of 0.012 inches indicates a one ounce weight must be added at the periphery of a 14 inch rim to balance such wheel.

Referring to FIG. 5, mounted under the free end of the amplification arm 23 is a several pound balancing weight 146 which is of sufficient weight to cooperate with the weight of such arm to sufficiently over-balance the weight of the drive motor 27 disposed on the opposite side of the balancing axis 21 to compress the calibration spring 139 and provide a sufficient movement about such axis 21 to prevent excessive tipping of such arm in response to a heavy point on an unbalanced wheel being rotated opposite thereto.

Referring to FIG. 5, a microswitch 147 is connected in series with the motor 27 and is mounted from the underside of the top wall of the arm 23 with its actuator button disposed centrally in an upwardly opening aperture 149. A set screw 151 carried from the casing 45 projects downwardly in alignment with such microswitch to engage such switch when the arm 23 is raised to its inoperative position to open the circuit to the motor 27.

In operation, the stand 11 is positioned in the desired location, such as a service station servicing stall, and such balancer then leveled. The leveling operation may be conveniently accomplished by releasing the actuator 120 to free the amplifying arm 23 to assure that the indicator 25 seeks the centered position shown in FIG. 8. A balanced wheel may then be mounted on the spindle 13, it being appreciated that as such wheel is moved into position with its centering hole receiving the cone 89, such cone will be depressed against the centering spring 97 to the position shown in FIG. 4 as the wheel is lowered to rest on the landing flange 85. If the balanced wheel unbalances the spindle 13 about the balancing axis 21, it will be appreciated that the spindle 13 is not aligned vertically over the balancing axis 21.

By rotating the wheel, the operator can determine if the spindle 13 remains unbalanced to the same side of the balancing axis 21 thus asssuring himself of the uneven setting of the stand 11 rather than unbalance of the wheel. The stand 11 may be leveled by adjusting the adjustment foot 41 (FIG. 1) to screw such foot inwardly or outwardly within the leg 39. If the balanced wheel carried on the spindle 13 tends to urge the free end of the amplifying arm 23 downwardly, it will be appreciated that the upper extremity of the cone 89 is pitched forwardly over the amplifying arm 23 thus tending to pivot such spindle 13 downwardly about the balancing axis 21 under the weight of the wheel. Thus, the adjustment foot 41 will be rotated to screw it outwardly to raise the front of the balancer to orient the spindle 13 in a vertical axis. If, on the other hand, the balanced wheel carried on the spindle 13 tends to raise the free end of the amplifying arm 23, it will be appreciated that the adjustment foot 41 must be screwed inwardly into the leg 39 to level the balancer about the axis 21. After leveling of the balancer has been completed, the actuator 120 may be rotated to return the arm 23 to its inoperative position and de-energize the motor 27.

It will be appreciated that the balancer of the present invention has many applications, such as the balancing of wheels, rims, brake drums, gears and the like. Assuming a wheel is to be balanced, such wheel may be placed on the spindle 13 in centered position on the landing flange 85. The actuator 120 may then be released to the position shown in FIG. 5 to free the amplifying arm 23 and effecting closure of the microswitch 147 to energize the motor 27. Energization of the motor 27 causes the motor rotor 107 to rotate rapidly in an unbalanced condition thus providing a slight vibration to the balancer to minimize the binding effect of any friction in the balancing bearings 19 or in the indicator 25 thus preventing any of the operating elements from hanging up.

Rotation of the motor 27 rotates the spindle 13 at approximately 5 r.p.m.'s thus providing sufficiently slow rotation of the wheel to enable the operator to properly observe operation of the balancer. It is important that such spindle rotates the wheel 29 sufficiently slowly to enable monitoring thereof and such rotation shouldbe between 1 and 10 r.p.m. It will be appreciated that as the heavy spot on the wheel rotates over the balancing axis 21 to approach alignment over the amplifying arm 23, the free end of such arm will commence being urged downwardly against the bias of the calibration spring 139 (FIG. 6) thus causing the actuating shaft 113 projecting from the indicator 25 to be depressed therein thus rotating the dial on such indicator in the negative direction. Downward travel of the free extremity of the amplifying arm 23 will continue and will be reflected by the indicator 25 until the heavy spot reaches a point directly over the arm 23, it being realized that at this point the moment arm of such heavy spot with respect to the balancing axis 21 is at its maximum. As the heavy point on the wheel passes over the amplifying arm 23 and continues rotating rearwardly toward the balancing axis 21, such moment arm for the heavy spot will be shortened thus tending to raise the free end of the amplifying arm 23 and reversing rotation of the dial on the indicator 25 thus indicating that the heavy spot on the wheel has just passed over such lever arm.

In a similar manner, as the light spot on the unbalanced wheel passes over the balancing axis 21 and commences approaching alignment above the amplifying arm 23, such arm will be overbalanced by the heavy spot disposed opposite thereto thus resulting in the free end of such arm being raised. The operator may monitor the indicator 25 to determine when the free end of such arm 23 reaches the extreme point of upward travel and by noting the point on such wheel which was in direct alignment over such arm at that point in time, he can positively locate the light spot on such wheel. Further, by observing the magnitude of deflection of the free end of the arm 23, such operator can determine the weight required to balance such wheel.

For the particular arrangement shown in the drawings, a deflection of the indicator 25 of +0.006 and −0.006 inches will be substantially balanced out by placing a 1 ounce weight at the periphery of a 14 inch wheel rim. It is noted that the indicator 25 is in a scale of thousandths of an inch. For different sized wheels, the calibration spring 139 will be moved inwardly or outwardly along the arm 23 to provide a corresponding adjustment for the difference in diameter for such rim.

Once the operator has located the light spot on the wheel, he can place the indicated weight on such light spot and continue rotation of the wheel to be assured that such weight is properly located. If the weight is of the right magnitude but is placed to one side or the other of the actual light spot, continued rotation of the wheel will cause the balancer to indicate a wheel unbalance located 90° from the original unbalance. Consequently, on the subsequent revolution the operator may shift the selected weight to one side or the other of his original location and continue such shifting until the exact point required for balance is located. The weight may then be secured in position and the wheel is ready for mounting.

Figure 4:
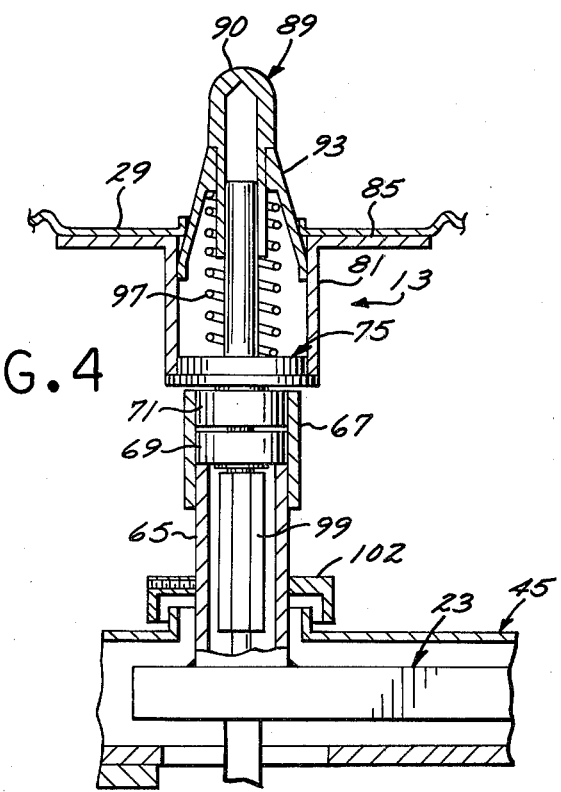
FIG. 4 is a horizontal sectional view similar to FIG. 3 but depicting a wheel mounted on the balancer.

As noted hereinabove, the subject balancer may be utilized for balancing numerous different items and it will be appreciated that if a brake drum is to be balanced, such drum may be positioned on the landing flange 85 in a manner similar to that for the wheel 29 shown in FIG. 4 and the balancing procedure repeated. If the brake drum does not have sufficient weight to depress the centering spring 97, a doughnut-shaped balanced weight may be placed thereon to be centered by the cone 89 to effect depression of the spring 97. The brake drum may then be balanced in the manner described hereinabove. An alternative manner of providing for depression of the cone by a lightweight brake drum is to replace the centering spring 97 with a lighter spring.

It will be appreciated that with the wheels and brake drums of a vehicle exactly balanced by the balancer of the present invention, such wheels may be rotated from hub to hub on the vehicle without detrimental effect on the balance of the assembled unit.

From the foregoing, it will be apparent that the rotary balancer of the present invention provides an economical means for positively balancing an unbalanced work piece. Such balancer is convenient to operate and relatively foolproof in providing exact balancing of a wheel or the like.

I claim:

1. A low speed rotary balancer for detecting unbalance of a work piece and comprising:
   a stand;
   spindle means including a receiver for receiving, supporting and centering said work piece;
   means mounting the spindle means for rotation about a vertical axis;
   horizontal tilting axle means attached to the mounting means at a point below said spindle means;

bearing means mounting said axle means from said stand for free tilting of said spindle means about said horizontal tilting axle means an amplifier arm connected on one end to said mounting means and projecting horizontally therefrom in one direction to form a free end;

weight means disposed on opposite sides of said horizontal axle for normally urging said spindle towards its centered position;

vibration means for vibrating said balancer to minimize frictional resistance; and indicator means coupled with the free end of said arm to indicate vertical travel thereof whereby said unbalanced work piece may be placed on said receiver and said work piece rotated slowly to rotate said spindle means to cause said spindle means to teeter about said horizontal axle, thereby moving the free end of said arm to actuate said indicator to a degree dictated by the magnitude by which said work piece is out of balance.

2. A low speed rotary balancer according to claim 1 that includes:

a drive motor mounted on said stand and connected with said spindle means for rotating said spindle means.

3. A rotary balancer as set forth in claim 2 wherein:

said drive motor is suspended from said amplifier arm and is disposed on the opposite side of said balancing axis from said free end of said arm and said balancer includes;

weight means including counterbalance means mounted on the free extremity of said arm for cooperating with said arm to counterbalance said drive means.

4. A rotary balancer as set forth in claim 2 wherein: said drive motor rotates said spindle at less than 10 r.p.m.'s.

5. A rotary balancer as set forth in claim 4 that includes:

an actuator for selectively locking said amplifier arm against rotation about said tilting axis.

6. A rotary balancer as set forth in claim 1 wherein:

said stand includes height adjustment means under said arm for selectively raising one side of said stand to level said stand.

7. A rotary balancer as set forth in claim 1 for balancing a wheel including a centering hole, and including:

centering cone means mounted on said spindle means for receipt in said centering hole to center said wheel on said spindle.

8. A rotary balancer as set forth in claim 1 wherein:

said receiver is formed with an open ended barrel and includes an upstanding axial stem therein; and said spindle means includes cone means telescoped on its bottom extremity into said barrel and formed with an axial bore telescoped over said stem.

9. A rotary balancer as set forth in claim 1 wherein:

said indicator means includes a machinist's gauge indicating travel of said free end of at least a thousandth of an inch.

10. A rotary balancer as set forth in claim 1 that includes a reference arm projecting from said stand coextensive with said amplifier arm and wherein:

said indicator means includes a scale having a neutral reading with indicia leading opposite directions therefrom; and said weight means includes counterbalance means mounted on said amplifier arm and cooperating with said arm to provide a predetermined weight action downwardly at a selected point on said amplifier arm and wherein said balancer includes bias means interposed between said reference and amplifier arms at said selected point and has a deflection ration sufficient to cause said predetermined weight, when said spindle means in unloaded, to deflect said bias means sufficiently to hold said indicator means at said neutral reading on said scale.

11. A low speed rotary balancer for detecting unbalance of a work piece and comprising:

a stand;

spindle means including a receiver for receiving, supporting and centering said work piece;

means mounting said spindle means for rotation about a vertical axis;

horizontal tilting axle means attached to the mounting means at a point below said spindle means;

bearing means mounting said horizontal tilting axle means from said stand for free tilting of said spindle means about said horizontal tilting axle means an amplifier arm connected on one end to said mounting means and projecting horizontally therefrom in one direction to form a free end;

weight means disposed on opposite sides of said horizontal tilting axle means for normally urging said spindle means towards its centered position;

indicator means coupled with the free end of said amplifieer arm to indicate vertical travel thereof; and calibration means coupled with said amplifier arm for calibrating said indicator means for indicating the weight required at different diameters for different diameter work pieces and whereby said calibration means may be adjusted for the diameter of an unbalanced work piece, such work piece placed on said receiver and rotated slowly to rotate said spindle means to cause said spindle means to teeter about said horizontal tilting axle means, thereby moving the free end of said arm to actuate said indicator means to a degree dictated by the magnitude by which said work piece is out of balance to indicate the weight required to bring said work piece into balance.

12. A rotary balancer as set forth in claim 11 wherein:

said receiver is formed with an open ended barrel and includes an upstanding axial stem therein; and said spindle means includes cone means telescoped on its bottom extremity into said barrel and formed with an axial bore telescoped over said stem.

13. A rotary balancer as set forth in claim 11 wherein:

said indicator means includes a machinist's gauge indicating travel of said free end of at least a thousandth of an inch.

14. A rotary balancer as set forth in claim 11 that includes a reference arm projecting from said stand coextensive with said amplifier arm and wherein:

said indicator means includes a scale having a neutral reading with indicia leading opposite directions therefrom; and said weight means includes counterbalance means mounted on said amplifier arm and cooperating with said arm to provide a predetermined weight action downwardly at a selected point on said amplifier arm and wherein said balancer includes bias means interposed between said reference and amplifier arms at said selected point and has a deflection ratio sufficient to cause said predetermined weight, when said spindle means is unloaded, to deflect said bias means sufficiently to hold said indicator means at said neutral reading on said scale.

15. A rotary balancer as set forth in claim 11 that includes:
a drive motor mounted on said stand and connected with said spindle means for rotating said spindle means.

* * * * *